United States Patent [19]

Küsters et al.

[11] 4,256,034

[45] Mar. 17, 1981

[54] PAPER CALENDER AND ITS OPERATION

[75] Inventors: Eduard Küsters, Gustar-Fünders-Web 18, 4150 Krefeld, Fed. Rep. of Germany; Werner Hartmann, Krefeld, Fed. Rep. of Germany

[73] Assignee: Eduard Küsters, Krefeld, Fed. Rep. of Germany

[21] Appl. No.: 67,524

[22] Filed: Aug. 17, 1979

[30] Foreign Application Priority Data

Oct. 10, 1978 [DE] Fed. Rep. of Germany ....... 2844051

[51] Int. Cl.³ ............................................. B30B 15/34
[52] U.S. Cl. ...................................... 100/38; 29/130; 29/132; 100/93 RP; 100/176; 100/170; 165/90
[58] Field of Search .................... 100/38, 93 RP, 170, 100/168, 176; 29/130, 132; 165/90

[56] References Cited

U.S. PATENT DOCUMENTS

| 2,908,964 | 10/1959 | Appenzeller | 100/93 RP |
| 3,082,683 | 3/1963 | Justus | 100/93 RP |
| 3,153,378 | 10/1964 | Nelson | 100/38 |
| 3,196,520 | 7/1965 | Appenzeller | 100/170 X |

FOREIGN PATENT DOCUMENTS

| 7003850 | 11/1970 | Netherlands | 29/132 |
| 1033839 | 6/1966 | United Kingdom | 100/93 RP |

*Primary Examiner*—Billy J. Wilhite
*Attorney, Agent, or Firm*—Kenyon & Kenyon

[57] ABSTRACT

A paper calender using a polyurethane coated calendering cylinder is operated with the coating maintained at an unusually low temperature found to prevent damage to the coating when calendering at high speeds and pressures.

9 Claims, 5 Drawing Figures

PAPER CALENDER AND ITS OPERATION

BACKGROUND OF THE INVENTION

Most papers coming from the drying portion of the paper-making machine require a post-treatment for improving their surface structure, especially if they are to be used for printing or writing purposes. The surface of the paper is determined by its smoothness and its sheen. As smoothness is designated the evenness of the paper surfaces; the sheen is a measure for the homogeneous optical reflectivity of the paper surface and is increased by compression thereof. The term covers the entire scale from "high-gloss" to "mat".

To increase smoothness, the paper is conducted through smoothing mechanisms with interacting hard cylinders which flatten the paper. Due to the fact that the paper is compressed more at points of greater thickness and less at points of smaller thickness, non-uniform sheen results from the smoothing, and in the case of higher pressures, even dark spots appear in the paper. To eliminate these irregularities, the paper is subsequently conducted through a calender or supercalender, in which hard and soft cylinders cooperate. The soft cylinders densify the surface of the paper. Because they are not completely rigid at their surface like a metal cylinder, they can adapt to the differences of the paper surface caused by the different densities of the smoothed paper, and can exert a uniformly densifying action thereon. In this effect, friction also plays a role. The soft cylinders are compressed somewhat in the rolling gap, whereby a slight deformation bulge is formed, because the soft cylinder adapts itself to the hard cylinder over a short distance. The deformation leading to the bulge is accompanied by dislocations which also have components parallel to the web surface, so that a friction or massage effect takes place which is of great importance for the surface action.

The so-called soft cylinders can consist of so-called paper cylinders which are made by stacking circular paper disks along the cylinder axis and compressing the stack in that direction. These cylinders are very sensitive at their surface. Every defect of the web is impressed into the surface and remains as a deformation therein, so that grinding or extensive washing of the cylinder is necessary to remove them.

In supercalenders, twelve or more cylinders are arranged on top of another; steel cylinders and soft cylinders alternate. To achieve the surface effect proper, only a few "nips" (cylinder gaps) would be sufficient. The further nips are only required to equalize surface defects of the paper which were generated by surface defects of the first cylinders.

The large number of cylinders on top of each other leads to a heavy, not always desired densification of the paper if the cylinders rest on top of each other with their weight and correspondingly high line pressures prevailing in the lower nips. If this is to be avoided, extensive apparatus for the partial equalization of the cylinder weight is necessary.

To this must be added that disturbances in the operation of a supercalender due to tearing of the paper or formation of creases are quite frequent, so that it must be shut down often. During such shutdown periods, however, very large amounts of paper which cannot be processed further, are produced because of the high operating velocities, up to 1000 m/min, of modern paper-making machines, since the paper-making machine as such must continue to run, of course. In order to prevent these losses, it is customary to connect to the paper-making machine two super calenders outside the paper-making machine proper, so that if one of them fails, the production of the paper-making machine can be transferred to the other.

The overall cost for refining the surface of the paper produced is therefore considerable.

It has already been attempted to use as the soft cylinders, instead of the designs known heretofore, the sensitivity of which has caused a major part of the high costs, cylinders with a working cylinder periphery of different materials. In these experiments, it was found that polyurethane has properties which make it outstandingly suitable for improving the surface finish of paper. The polyurethane is applied to a metal cylinder in liquid form and is cross-linked at its surface to form a dense coating firmly contacting the metal and which, for the purposes under consideration here, has a hardness in the range of about 60 to 75 Shore D.

The effects on the paper attainable with such polyurethane cylinders are therefore at least equal, if not superior, to the soft cylinders customary to date in super calenders, with respect to the attainable effect. They even have a smoothing effect. A particularly important additional effect is, however, that the cylinder material has an enormous restoring ability, so that a surface defect which was impressed into the surface of the polyurethane cylinder, for instance, if a hard spot or a doubling of the paper web has run through, is restored already after one revolution of the cylinder, so that nothing is seen any more on the cylinder surface. This equalizes the surface structure substantially. Since no defects are retained in the surface of the cylinder, it is also possible to dispense with quite a number of cylinders of the calender, which only had the purpose of equalizing the defects caused in the paper web by the surface defects of the soft cylinders. If polyurethane cylinders are used, it is therefore possible to limit the number of cylinders to what is necessary to obtain the effect on the paper.

In spite of all these convincing advantages, polyurethane cylinders could be used so far for improving the surface finish of paper, only in isolated cases at low operating speeds and relatively low pressures, because it has not been possible to make the cylinders durable at higher operating speeds and line pressures. It was found again and again that quite suddenly, the treatment effect on the paper web was diminished at one point of the operating width, and damage to the surface of the polyurethane was found.

Various efforts have been undertaken to control these phenomena by varying the layer thickness of the polyurethane and its composition but these endeavors have not been rewarded to date in any manner. For purposes of the kind under consideration here, cylinders with polyurethane coatings could not be used in production machines up to now.

Applicant has made numerous tests to find the cause for the so far uncontrollable malfunctioning of polyurethane coatings for the improvement of the surface finish of paper. The tests were carried out with an arrangement of two cooperating cylinders, of which one was a deflection-controlled roll or so-called floating cylinder with a working cylinder periphery of steel, and the other cylinder was a conventional cylinder with a polyurethane coating.

If constant properties of the paper web to be processed can be assumed, the mechanical stress of the polyurethane follows from the operating speed and the line pressure. It is clear that due to the deformation of the resilient polyurethane, a certain amount of deformation energy is spent which is produced in each zone when it runs through the cylinder gap. The released power depends on the number of traversals, i.e., directly proportionally to the operating speed. The deformation energy also increases with the line pressure, although not proportionally, since the deformation is not twice as large for twice the line pressure but assumes some value determined by the shape of the deformation bulge.

In the tests, the load was first increased until a recognizable decrease of the treatment effect on the paper occurred. When this point was reached, an important finding was made: The temperature of the surface of the polyurethane cylinder was always surprisingly high in these cases. It was found that the treatment effects of the polyurethane occur on the paper only if the surface temperature of the polyurethane is below 50° C.

The test stand was then equipped with a highly sensitive temperature measuring and recording system which was capable by means of an infrared radiation thermometer to pick up and record temperature differences of one degree of the surface of the polyurethane layer. The measuring head with the radiation thermometer was led back and forth continuously in the lengthwise direction along the cylinder during its operation, so that the temperature on the entire cylinder surface could be measured continuously.

This comprehensive temperature monitoring system showed that it happened during the operation of the polyurethane cylinder that the temperature at a given point rose at some time suddenly very rapidly, i.e., within seconds, without any visible external cause, to values at which thermal decomposition of the polyurethane occurs. These seemingly random temperature increases occur locally and not uniformly on the entire cylinder periphery. It is thus possible that the latter is overall in the range below 50° C. which is considered as usable. Nevertheless, a local temperature increase leading to the destruction of the cylinder occurs sooner or later at some point.

The consideration on the origin of these phenomena led to the discovery that the cross-linked polyurethanes of interest for the coating of cylinders convert an extraordinarily high percentage of the deformation energy into heat. Since, in addition, polyurethane is a poor heat conductor, the heat is removed only slowly from a point at which a temperature rise has occurred. Accordingly, the local increase of the volume that occurred at the respective point due to thermal expansion, is at first retained. The point therefore enters the nip again in the next revolution so-to-speak as a bulge. When traversing the nip the next time, the point now receives increased deformation because first, the bulge is formed back to the old shape of the circumference of the cylinder and then, the normal surface deformation in traversing the nip is added. This in turn leads to an increased production of heat at the same point and thus, to still more thermal expansion of the material there. In this manner, the process builds rapidly until the surface temperature at the respective point reaches values which the material can no longer withstand.

The starting point for such local temperature increases can be the most varied of circumstances, which are all equipment-related and can therefore not be avoided.

A main reason, of course, is an irregularity in the paper web, for instance, a thickening of the mass of the paper in the form of a longitudinal strip or a crease in the paper. The local deformation of the polyurethane accompanying this, if it acts on one and the same spot of the cylinder circumference in several revolutions, can already serve as the germ of a temperature increase which can no longer be stopped.

Another source of these phenomena can be irregularities in the material of the cylinder jacket itself. Even with the greatest care in the fabrication and most thorough mixing of the components, it cannot be precluded that under appropriate concentration conditions of the components, for instance, greater cross-linking of the material and therefore, a kind of hard lump is developed at some point which is not visible from the outside but, with the sensitivity of the material, can be the cause of a local temperature increase which rapidly builds up to a destructive extent.

A third group of influence factors is related to the design of the cylinders, especially to their different deflection lines. In general, it is impossible to set two identical cylinders without deflection exactly opposite each other. Usually, the cylinders have different deflection lines, so that there are zones of higher pressure which are adjacent to zones of lower pressure. This is the case particularly if the deflection lines have inversion points. Although a far-reaching match to the deflection line of the matching cylinder can be achieved through the use of deflection-controlled cylinders such as floating cylinders, in which the cylinder is a tube held on a stationary core in bearings at each end, so that the remaining differences no longer matter for the treatment of the paper, the stress of the polyurethane is not sufficiently uniform but is larger in the zones of higher pressure, so that there, temperature increases due to the part converted into heat by the kneading energy results which can already be the cause for initiating the already mentioned buildup of the temperature increase effect and the "running away" of the temperature.

Finally, the triggering element for this phenomenon can also be a temperature increase which is not generated by the deformation of the cylinder jacket but is introduced into the cylinder jacket directly as a temperature increase, be it by different temperature conditions in the support cylinder or in the matching cylinder, or by temperature differences which come about by temperatures in the paper web which are different in the transverse direction or by an only partial coverage of the polyurethane cylinder by the running paper web. Also these temperature differences introduced from the outside into the polyurethane layer lead to non-uniform thermal expansion and to a deviation of the shape of the cylinder from the ideal cylinder form, which is amplified as the cylinder rotates, in the already described manner.

Therefore, there is a total of possible inhomogeneities, the effects or appearance of which are unforeseeable and which can trigger the local running-away of the temperature. Of course, the effect can be avoided by reducing the operating speed and the line pressure. Then, however, operation is possible only under conditions which are of interest at most in isolated cases. Rather, it is the intent of this invention to allow the use of polyurethane cylinders in the heretofore inaccessible ranges above an operating speed of 350 m/min and a line pressure above 80 kg/cm cylinder length, to obtain a pronounced treatment effect at high throughput velocities.

It is therefore an object of the invention to prevent in a pair of cylinders of the type described, the occurrence of local temperature run-away in the mentioned stress ranges with reliability also for extended periods of operation.

EXPLANATION OF THE INVENTION

In applicant's extensive tests it has become clear that a stress-dependent temperature limit exists, below which the inhomogeneities of the arrangement do not matter any more and the material of the cylinder remains "quite" under all conditions. This in itself is a surprising finding because it would normally be expected that through cooling, only the entire temperature level is lowered but that the basic situation is not changed, at which, when a local deformation or temperature inhomogeneity occurs, a further temperature increase takes place there up to destruction, which cannot be stopped. The prognosis would normally be that such an increase then sets in merely at a lower temperature and takes longer until it gets into a destructive temperature range, but that this occurs in principle in the same manner. In actuality, however, just the opposite is the case: If the cylinder material is cooled below the calculated temperature limit, a local increase of the temperature into unpermissible ranges does not occur any more at all.

The temperature in the entire polyurethane material must be below the value indicated. It therefore does no good to cool the cylinder only from the outside until the surface has just reached the required temperature. If the temperature is higher in the interior, then the destructive temperature increase starts in the interior.

The required heavy cooling can be achieved only from the inside but not by only cooling the surface of the material. In all practical cases, the temperature distribution in the cylinder jacket is therefore any way such that the lower temperatures are inside and the maintenance of the temperature is ensured in the entire material if it is maintained at the cylinder surface. The temperature values at the surface are preferred because they are naturally the easiest to measure.

The temperature of the cylinder jacket consisting of polyurethane should not rise above the temperature limit $T_G$ "in operation". "In operation" means a steady state at which the pair of cylinders runs under the conditions desired for the surface finishing of paper, i.e., in the range of a line pressure above 80 kg/cm cylinder length and an operating velocity above 350 m/min.

Cooling cylinders is known per se, for instance, from German Pat. No. 563 761 and German Pat. No. 76 00 746. With the cooling systems practiced so far, however, the cooling capacity required with the invention cannot be brought into the cylinder. This is due to the considerable deformation energy which is converted into heat with every revolution of the polyurethane cylinder. With the invention, it is necessary to work with heavy-duty refrigeration units which can cool large quantities of cooling liquid down to $-20°$ C. and below.

For the temperature limit $T_G$, the formula $$T_G = 23 - V/100 - 2(P/100)^2$$

was derived from the test results. This gives the temperatures, below which the surface of the working cylinder jacket of polyurethane must be kept for a given pair of values (V, P) in order to maintain stable conditions. It is to be understood that V=velocity or speed of the paper web and the P=the line pressure of the cylinder.

The temperature limits which are obtained from the above formula and were ascertained in the tests, may not represent any special problem at first glance. In practice, however, it is extremely difficult to maintain these temperatures in operation under the conditions stated.

The required refrigeration capacity is such that the cooled cylinder, once it comes to a standstill, ices over immediately by the freezing condensate from the air.

Also with the pair of cylinders running, condensation may be a problem. So much condensate can collect on the surface of the polyurethane cylinder that a sort of aquaplaning effect results and it is not possible to start the machine unless the matching cylinder has a drive, the speed of which is synchronized with that of the polyurethane cylinder. Also, a paper web is suctioned full of the condensate adhering to the cylinder when it is introduced, and thereby loses so much mechanical strength that for this reason, starting the machine is a difficult operation. It has been found, however, that by brief blasting of the cylinder gap with hot or dry air, these difficulties can be overcome.

In any case, the importance of these secondary effects fade into the background in view of the fact that with the invention it is possible to employ polyurethane cylinders for the treatment of paper webs in ranges of the line pressure and the operating speed which were heretofore closed to it.

Nevertheless, it is advisable, of course, to let the secondary effects come to the fore as little as possible. For this reason, it is advisable to cool no more than necessary and to select the temperature so that it is no more than 2° C. below $T_G$.

With respect to the wall thickness of the polyurethane, a compromise must be found between the achievable treatment effect and the collability. Practical experience has shown that a design using a wall thickness of from 4 to 6 mm is correct in this respect. A wall thickness of 4 to 6 mm still retains the high "absorption capacity" of polyurethane for defects of the paper web and the restoring capacity and is at the same time so small that heat can be transported off into the interior of the support cylinder to a sufficient extent. With thicker layers, this becomes a problem because of the poor thermal conductivity of polyurethane.

To aid the cooling of the cylinder with the working cylinder jacket of polyurethane, it may be advisable to cool also the matching cylinder; in that case it is advantageous if the temperature of the matching cylinder is substantially equal to the temperature at the surface of the polyurethane, because then the heat transfer between the cylinders is lowered to a minimum.

Care must be taken, of course, that the cooling is uniform over the length of the matching cylinder, so that new irregularities in the temperature distribution are not introduced into the cylinder with the polyurethane jacket by the cooling of the matching cylinder. Sometimes there are critical spots on the length of the cylinder, because of which the temperature of the cylinder jacket must be lowered overall more than would be necessary per se because of the other regions of the cylinder jacket. These places can be approached specifically by using a device for zone-wise external equalization cooling of the matching cylinder, so that they lose their critical properties. Devices for external equalization cooling are known per se. This can involve local blasting with air, running along narrow cooled rollers, or the like.

The invention requires great cooling of the polyurethane, and one must work with temperatures of the cooling liquid which are substantially lower than those customary before. To obtain sufficient heat removal, it is also advisable to use a cooling liquid with high thermal conductivity. Such cooling liquid are known and some are described on pages 79-94 of the text ENCYCLOPEDIA OF CHEMICAL TECHNOLOGY, Kirk-Othmer, Volume 3, Third Edition, copyright 1978 by John Wiley & Sons, New York, N.Y.

An important embodiment example of the invention is a paper-making machine which contains a smoothing calender with at least one pair of cylinders of the type under discussion. Contrary to supercalenders, such a smoothing calender can be incorporated into the paper-making machine and furnishes a paper in the course of the production of the paper-making machine, which is improved also with respect to the sheen. To obtain a sheen and smoothness effect on both sides, two of the cylinder pairs under discussion must be provided, of course, in tandem in reverse configuration.

Another possible application is in a rotary printing press. It is frequently desirable to improve the surface structure of a paper before it is printed on. This may be the case, for instance, if the paper has been stored for a long time and has become rough or porous at the surface. By using one or two pairs of cylinders according to the invention, the surface can be densified in the course of the operation of the rotary printing press, which makes the print stand out more clearly.

Such arrangements have become possible only because through the invention, the use of polyurethane cylinders is realizable at high line pressures and, in particular, high operating speeds.

BRIEF DESCRIPTION OF THE DRAWINGS

An embodiment example of the invention is shown in the drawings in which.

DETAILED DESCRIPTION OF THE DRAWINGS

Figure 1:
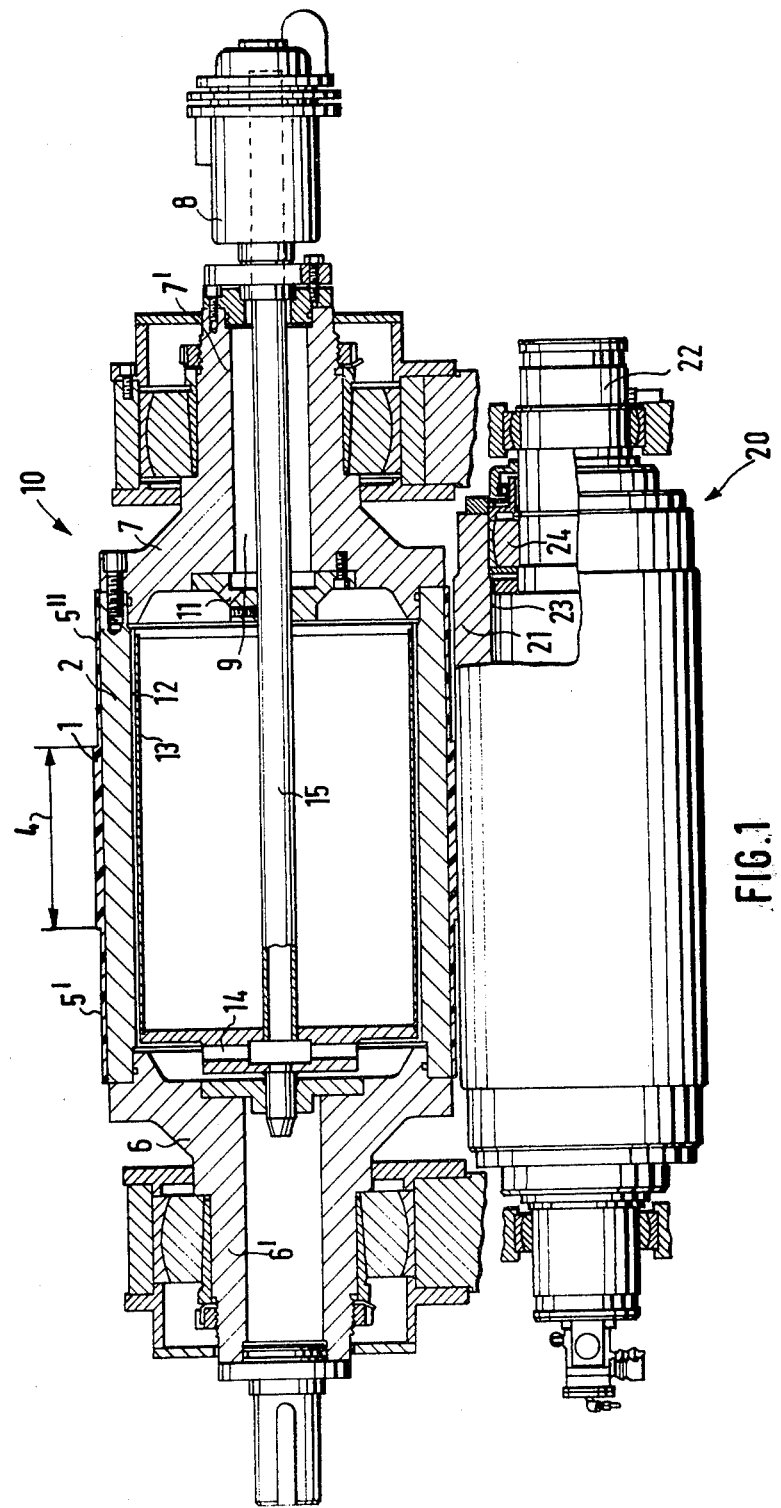
FIG. 1 shows the pair of cylinders according to the invention, and which has served for the tests.

The pair of cylinders shown in FIG. 1 comprises an upper cylinder designated as a whole with 10, with a working cylinder jacket 1 of polyurethane having a thickness of 4 to 6 mm, and a matching cylinder, designated as a whole with 20, in the form of a floating cylinder with a working cylinder jacket 21 of steel.

The cylinder 10 is a hollow cylinder with a tubular cylinder body 2 made of steel, over which the working cylinder jacket 1 of polyurethane is applied so as to firmly contact the steel body. To delineate a working width 4, the polyurethane is ground down to a smaller wall thickness in the outer regions 5. The cylinder body 2 has a driven end section 6 with a cylinder journal 6' and an end section 7 with a cylinder journal 7', through which the cooling liquid is admitted. The latter is circulated through the connecting section 8 into the canal 9 of the cylinder journal 7' and, from there, passage holes 11 into the space 12 between the inner circumference of the cylinder body 2 and the outer circumference of a drum 12 which nearly fills the interior of the cylinder body 2. The entire cooling liquid is forced to pass through the narrow space 12 lengthwise and is discharged in the vicinity of the end section 6 through the passage openings 14 and the tube 15 coaxial to the cylinder axis and out through the connecting section 8.

The mating cylinder 20 comprises a stationary core 22 which goes through the hollow cylinder 21 and leaves a space from the latter. To both sides of the core 22, a longitudinal chamber 23 is divided off between the core and the inside circumference of the hollow cylinder 21. The manner in which the dividing can be done is well known and is exemplified by U.S. Pat. Nos. 2,908,964 and 3,196,520. This chamber can be filled with pressure fluid, by means of which the hollow cylinder 21 can be pushed from the inside against the cylinder 10. Since the hollow cylinder is supported on the core 22 in self-aligning bearings 24 at the ends, the deflection of the hollow cylinder 21 can be adjusted as required. Because of the spacing of the hollow cylinder 21 from the core 22, the latter can bend inside the hollow cylinder 21 and supply the necessary counter forces in this manner.

In the test setup, an infrared radiation thermometer was provided which was moved back and forth along the working width 4 of the working cylinder circumference 1 of polyurethane. The measurement accuracy of this thermometer is better than 1 degree. It was possible to determine the temperature of the working cylinder jacket continuously during the operation and to record it on a recorder.

Figure 2:
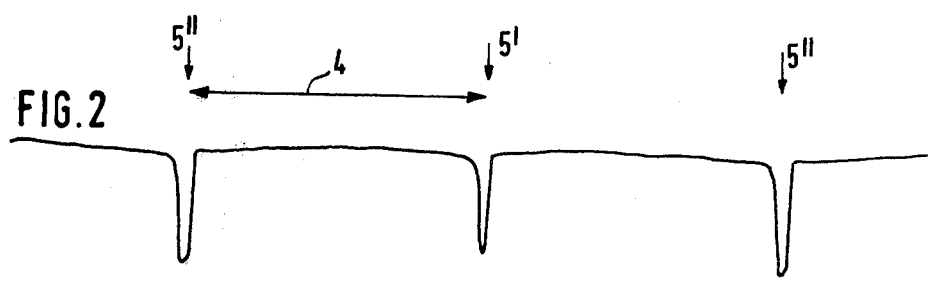
FIGS. 2 to 4 graphically show different temperature distributions in the cylinder jacket.
Figure 3:
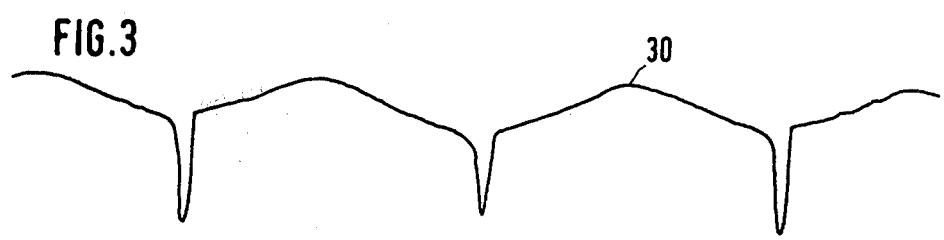
Figure 4:
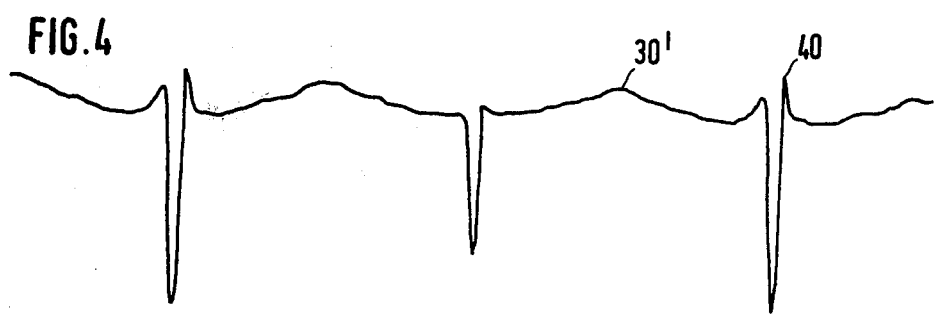

In FIGS. 2 to 4, examples of such temperature recordings are reproduced. FIG. 2 shows an even temperature distribution along the working width 4, as is desired for stable conditions. In the movement beyond the end of the working width, the thermometer gets onto the ground-down lateral region 5 for a short distance, where no deformation energy is produced and which has a substantially lower temperature because of the cooling. This brings about the downward peaks. Existing asymmetries of the peaks are related to the existing sluggishness of the temperature recording.

The recording strip continues to run steadily during the back-and-forth motion of the thermometer. The section in FIG. 2 begins at the left end with a motion of the thermometer from left to right according to FIG. 1 along the working width 4. The thermometer arrives beyond the edge of the working width at the region 5" and returns immediately. This is indicated by the marking 5" on the left in FIG. 2. The thermometer moves to the left edge of the working width in FIG. 1, gets into the zone 5' and returns again, to get into the region 5" again after traversing the working width 4 and to reverse there again, as indicated by the marking 5" to the right in FIG. 2.

While FIG. 2 represents a permissible temperature distribution, in which the temperature varies less than 1° over the working width 4, FIG. 3 shows a typical example for a temperature distribution which leads to the destruction of the polyurethane coating 1 in a short time. Starting from the conditions as per FIG. 2, the stress of the cylinder pair has increased. Thereby, due to an uneven stress distribution or to other influences, a temperature maximum 30 has been set up in the center of the working width 4, which will be amplified substantially in a short time and will reach temperatures which lead to the destruction of the polyurethane material.

Naturally, not every test has been run to the destruction of the cylinder coating. After such destruction has occurred several times, experience has been accumulated regarding the shape of temperature distributions which at one point lead to a further increase which cannot be stopped any more. If then such a temperature distribution occurred which experience shows to lead to a further temperature increase which cannot be stopped any more, the stress was reduced. The temperature of the working cylinder jacket was then too high to remain stable under the existing stresses.

Also FIG. 4 shows an unstable temperature distribution. In FIG. 3, only one maximum 30 in the center of the working width 4 was present. Such a maximum 30' can also be seen in FIG. 4, although in less pronounced form. Instead, a sharp maximum 40 can be seen additionally at one edge of the working width 4, which is already so pronounced that, according to experience, it will lead to a further temperature rise in this region. The conditions are therefore also unstable if a pattern according to FIG. 4 occurs.

In this manner, a large number of tests was run and plotted in diagram form. For instance, the average exit temperature at the surface of the working width 4 was plotted for a given line pressure versus the operating speed and each measured point was characterized as "stable" or "unstable". If the temperature distribution retained the appearance as per FIG. 2 for an extended period of time, the point was given the characterization "stable", but if patterns similar to FIGS. 3 and 4 appeared, in which according to experience still further temperature increases can be expected, the characterization read "unstable".

From the total of the plots, a borderline was recognizable which separates the region of stable stresses from that of unstable stresses.

Figure 5:
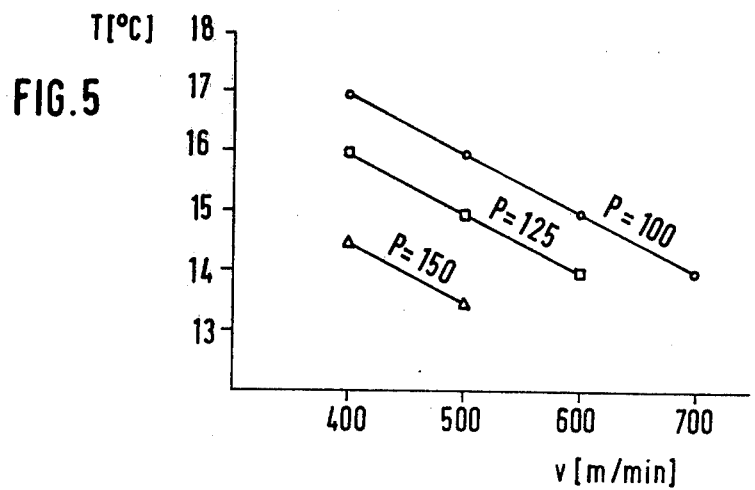
FIG. 5 graphically shows the temperature limits determined.

In FIG. 5 such borderlines are plotted for different line pressures. Thus, if for instance, at a line pressure P=100 and an operating speed of 600, the temperature at the surface of the polyurethane is more than 15°, the state of stress is unstable and a progressive temperature rise and destruction of the cylinder jacket occur at some point. However, if stronger cooling is applied and a temperature at the surface below 15° C. is run, then a line pressure of 100 kg/cm cylinder length and an operating speed of 600/min can be maintained indefinitely without deviating unduly from a temperature distribution as per FIG. 2.

For the temperature limit $T_G$, the formula $$T_G = 23 - V/100 - 2(P/100)^2$$

was derived from the test results. This gives the temperatures, below which the surface of the working cylinder jacket 1 of polyurethane must be kept for a given pair of values (V, P) in order to maintain stable conditions.

What is claimed is:

1. A paper calender comprising at least two substantially matching rotative cylinders for calendering a traveling paper web passed between them, one of the cylinders having a polyurethane coating, means for continuously rotating the cylinders so as to cause the web to travel with a velocity V, means for pressing the cylinders together so as to cause them to have a line pressure P on the web, and means for maintaining the coating at a temperature T during continuous calendering of the web, T being less than a temperature limit $T_G$ which equals $23 - v/100 - 2(P/100)^2$.

2. The calender of claim 1 in which the temperature T is not more than 2° C. below $T_G$.

3. The calender of claim 1 in which said coating firmly connects with said cylinder and the coating has a wall thickness of from about 4 mm to about 6 mm.

4. The calender of claim 3 in which the coated cylinder is a hollow metal cylinder and contains a drum having a periphery closely spaced from the inside of the metal cylinder to form an annular space of small wall thickness, and means are provided for passing a coolant having a temperature less than −20° C. through the annular space.

5. The calender of claim 4 in which said coating has a hardness in the range of 60 to 75 Shore D.

6. Method for operating a paper calender having at least two rotating cylinders calendering a paper web traveling between them, one of the cylinders having a polyurethane coating with a hardness in the range of 60 to 75 Shore D, the method comprising rotating the cylinders so as to cause the web to travel with a velocity V while pressing the cylinders together to produce a line pressure P on the web, and cooling the coating heavily so its temperature T during the calendering is less than a temperature limit $T_G$ which equals $23 - v/100 - 2(P/100)^2$.

7. The method of claim 6 in which the coated cylinder is a hollow metal cylinder coated with polyurethane, and said cooling is effected by flowing a liquid coolant having a temperature of less than −20° C. in contact with the inside of the hollow cylinder.

8. The method of claim 6 in which said web is cooled to the temperature T before contact with the cylinders.

9. The method of claim 6 in which V is greater than 350 m/min and P is greater than 80 kg/cm.

* * * * *